United States Patent
Sodomka et al.

(10) Patent No.: US 10,565,613 B2
(45) Date of Patent: Feb. 18, 2020

(54) SIMULATING ADVERTISING CAMPAIGNS

(71) Applicant: Facebook, Inc., Menlo Park, CA (US)

(72) Inventors: Eric Michael Sodomka, Menlo Park, CA (US); Michael Charles Bailey, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 992 days.

(21) Appl. No.: 14/671,991

(22) Filed: Mar. 27, 2015

(65) Prior Publication Data
US 2016/0283974 A1    Sep. 29, 2016

(51) Int. Cl.
*G06Q 30/02* (2012.01)

(52) U.S. Cl.
CPC ..... *G06Q 30/0247* (2013.01); *G06Q 30/0275* (2013.01)

(58) Field of Classification Search
CPC .............. G06Q 30/0275; G06Q 30/0247
See application file for complete search history.

(56) References Cited

U.S. PATENT DOCUMENTS

| | | | | |
|---|---|---|---|---|
| 6,484,182 B1* | 11/2002 | Dunphy | ............ | G06F 17/30958 700/231 |
| 6,961,858 B2* | 11/2005 | Fransdonk | .............. | G06F 21/10 380/281 |
| 7,020,635 B2* | 3/2006 | Hamilton | ............... | G06Q 20/00 705/51 |
| 7,080,049 B2* | 7/2006 | Truitt | ..................... | G06Q 20/16 380/30 |
| 7,090,128 B2* | 8/2006 | Farley | .................. | H04L 67/2823 235/384 |
| 7,107,462 B2* | 9/2006 | Fransdonk | ............. | G06Q 20/12 380/282 |
| 7,150,045 B2* | 12/2006 | Koelle | .................. | G06F 21/552 380/201 |
| 7,587,502 B2* | 9/2009 | Crawford | ................ | A63F 13/12 463/42 |
| 7,620,606 B2* | 11/2009 | Gentry | ................... | G06Q 20/02 380/277 |

(Continued)

OTHER PUBLICATIONS

M. Naldi et al, "A Model for the Dynamics of Bidders in the Simulation of Keyword Auctions," 2011 UkSim 13th International Conference on Computer Modelling and Simulation (UKSim 2011), pp. 440-445, 2011. Retrieved on Sep. 12, 2019. Retrieved from: <http://dx.doi.org/10.1109/UKSIM.2011.90> (Year: 2011).*

*Primary Examiner* — James M Detweiler
*Assistant Examiner* — Monica A Mandel
(74) *Attorney, Agent, or Firm* — Fenwick & West LLP

(57) ABSTRACT

An advertising simulation system performs simulation of advertising results. The advertising results indicate the results of a simulated auction for a set of ad queries that are provided advertisements from available advertisements. The simulated auction applies an advertising model to perform an auction using advertising conditions. As advertisers are selected to provide advertisements to individual ad queries, advertising conditions, such as advertiser's bidding amounts, may change. To effectively simulate a large number of ad queries, the advertising segments simulation and performs simulation of each segment. Each segment's ad results may affect the conditions of a subsequent segment, and the change in conditions may change the size of a subsequent segment.

8 Claims, 4 Drawing Sheets

(56) References Cited

U.S. PATENT DOCUMENTS

| | | | | |
|---|---|---|---|---|
| 7,711,586 B2 * | 5/2010 | Aggarwal | .............. | G06Q 10/02 |
| | | | | 700/14 |
| 2009/0112691 A1 * | 4/2009 | Abrams | ................ | G06Q 30/02 |
| | | | | 705/14.71 |
| 2012/0316957 A1 * | 12/2012 | Zhou | ...................... | G06Q 30/08 |
| | | | | 705/14.46 |
| 2014/0006141 A1 * | 1/2014 | Vassilvitskii | ...... | G06Q 30/0241 |
| | | | | 705/14.45 |
| 2014/0108159 A1 * | 4/2014 | Hughes | .............. | G06Q 30/0275 |
| | | | | 705/14.71 |
| 2015/0193815 A1 * | 7/2015 | Juda | .................. | G06Q 30/0244 |
| | | | | 705/14.43 |

* cited by examiner

SIMULATING ADVERTISING CAMPAIGNS

BACKGROUND

This invention relates generally to simulating advertising campaigns, and particularly to segmenting the simulation of a simulated advertising campaign.

Modern advertising platforms may serve hundreds of thousands of advertisements in an hour, and millions or tens of millions of advertisements in a day. As users access advertising publishers over the Internet, the advertising publishers may direct the user device to an advertising system with an ad query for the advertising system to provide an advertisement to the user. Advertisers set an advertising campaign with the advertising system including a budget and a duration in which to spend the budget.

When the advertising system receives an ad request, the advertising system selects an advertisement to serve to the user using an ad model that may provide for an auction among candidate advertisers. As advertisers win and lose auctions, the advertiser may be above or below expected spending for the budget and duration of the campaign. An advertiser's bid in the auction may be increased or decreased based on a pacing algorithm to spend the budget during the duration of the ad campaign. An advertiser or operator of the adverting system may wish to know the performance of advertisements under different conditions from the conditions under which ads were originally served. Performing an analysis of different conditions may be particularly difficult due to the immense scale of the number of advertisements served. A system that evaluates all ad queries with a static set of conditions may fail to reflect the change in conditions that occur as ads are served (such as modifying bids based on budget pacing) and provide inaccurate results.

SUMMARY

An advertising system simulates advertising selection for a set of ad queries by segmenting the ad queries and simulating individual segments of the ad queries. A segment is a set of advertising queries for which advertising selection is performed to identify, for each ad query, an advertisement that would have been selected using given conditions of the ad selection process. The conditions of the advertising selection are constant during the evaluation for a given segment. Thus, evaluation of each segment results in a simulation of many ad queries without updating conditions of the ad selection. After each ad segment, the advertising system evaluates the ad results for the segment and modifies conditions for the advertising selection process affected by the ad results for use with the next ad segment. These conditions may include a bid frequency, paced bid amount, and targeting criteria for advertisements. The segmented ads permit the advertising system to simulate a large number of advertisements and maintain more accurate simulated results.

In one embodiment, the frequency at which the conditions are modified during the simulation (i.e., the number of ad opportunities evaluated in a segment) varies based on the modification of the ad conditions. When the ad conditions are significantly changed by ad results, the number of ad queries included in a segment is reduced, and when the ad conditions are not significantly changed, the number of ad queries included in the segment is increased. That is, the frequency that the ad conditions are modified is affected by the change of the ad modifications. As one example, if a change in paced bid amounts for an advertiser exceeds a threshold, the number of ad queries in a segment are reduced, and when the change does not exceed the threshold, the number of ad queries in a segment are increased.

This segmenting permits the ads to be simulated for a very large number of advertisements (e.g., millions) while recalculating the ad conditions frequently enough to maintain sufficient accuracy in the simulation. This may permit the ad queries to be simulated without re-evaluating conditions after each advertisement, saving computational resources. In addition, as conditions may be constant during each segment, the individual ad queries in a segment may be processed in parallel, permitting the segments to be analyzed more quickly than had the ad queries been simulated without segmentation. In this way, segmenting and the dynamic adjustment of segment size achieves a tradeoff between simulation accuracy and use of computing resources. After evaluation, various metrics may be calculated for the simulated results for an advertiser, such as a number of impressions and reach of the advertising campaign, spending, ad effectiveness, and so forth.

Using the simulation, the advertising system operator or an advertiser can perform A/B or other testing to evaluate the effects of changing various features of the advertising auction system, such as modifying a pacing algorithm, advertising auction (bidding) model, allocation of advertisers to ad queries, reserve price, and other changes to the ad selection process.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
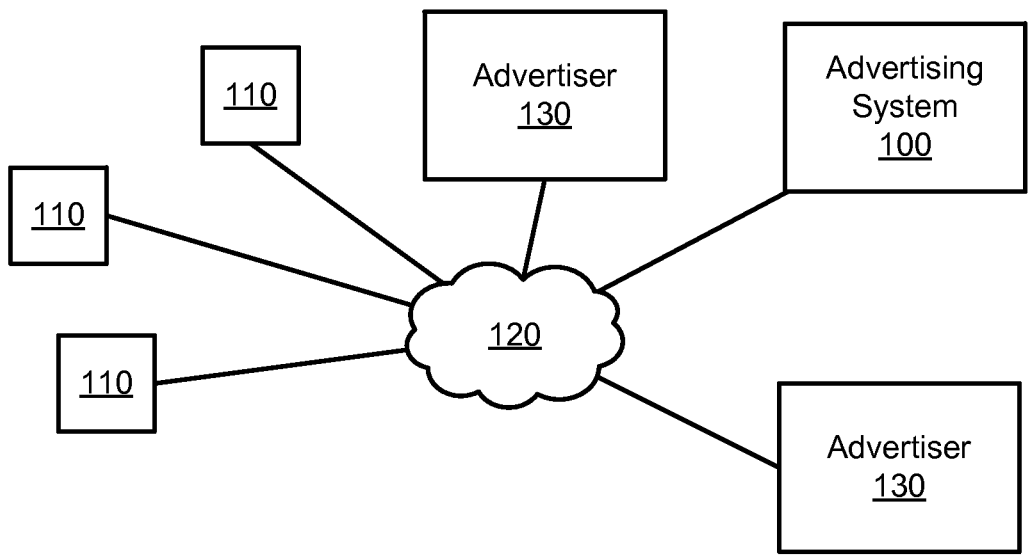
FIG. 1 is a high level block diagram of a system environment for an advertising system.

FIG. 1 is a high level block diagram of a system environment for an advertising system 100. The system environment shown by FIG. 1 comprises one or more client devices 110, a network 120, one or more advertisers 130, and the advertising system 100. In alternative configurations, different and/or additional components may be included in the system environment. The embodiments described herein can be adapted to online systems that are not social networking systems.

The advertising system 100 provides advertisements to client devices 110 to be provided to users of the devices 110. The advertising system 100 selects advertisements from advertising campaigns provided by advertisers 130 responsive to ad queries provided by the client devices 100. As further described below, the advertising system 100 simulates advertisement selection for a set of historical ad queries, permitting effective analysis of actual advertising requests at a large scale.

The advertising system 100 may provide advertisements for client devices accessing the advertising system 100 and operate as an ad publisher, or may provide advertisements for another ad publisher (not shown). An ad publisher is a system that provides content to a client device and provides a platform for a user to receive and browse such content. The ad publisher refers clients to the advertising system 100 to fill advertising slots on a page of the ad publisher. Example ad publishers include social networking systems, video streaming systems, news distribution systems, forums, and any other electronic system or webpage hosting service that provides content to users and displays ads through a referral to the advertising system 100.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the advertising system 100. For example, a client device 110 executes a browser application to enable interaction between the client device 110 and the advertiser 100. In another embodiment, a client device 110 interacts with the advertising system 100 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more advertisers 130 provide advertisements to the advertising system 100 to be served to the client devices 110. The advertisers specify an advertising campaign associated with the advertisements to the advertising system 100.

Each advertiser 130 may provide many concurrent ad campaigns to the advertising system 100, though for simplicity in this disclosure, each advertiser 130 is treated as providing a single advertising campaign.

Figure 2:
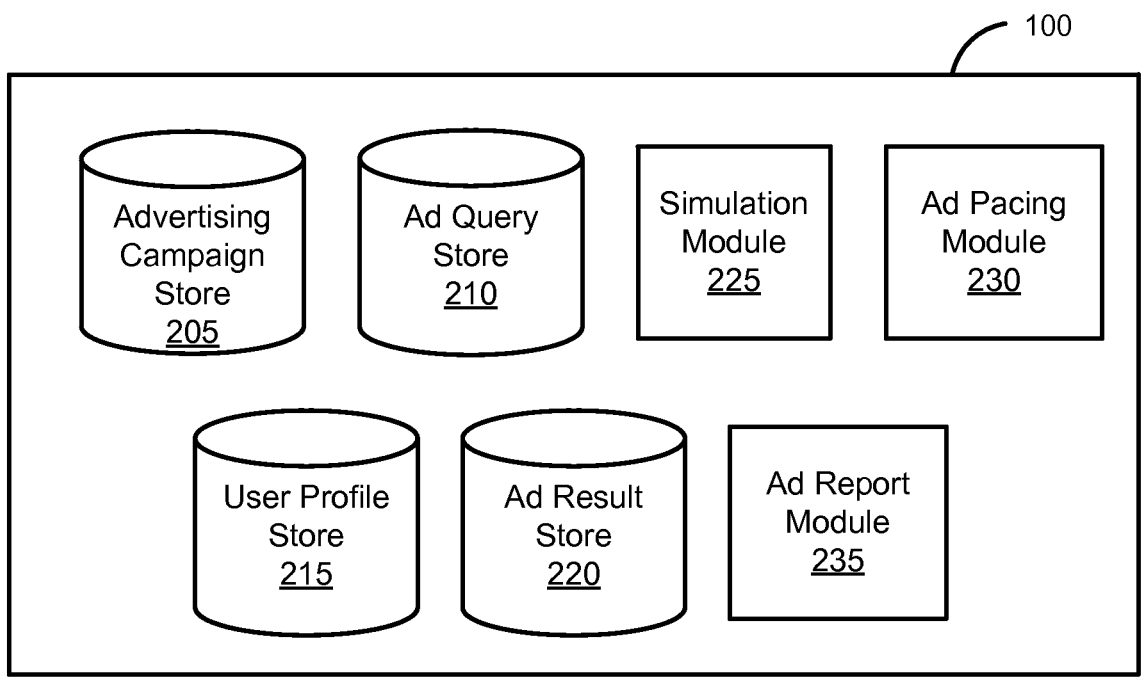
FIG. 2 is an example block diagram of an architecture of the advertising system.

FIG. 2 is an example block diagram of an architecture of the advertising system 100. The advertising system shown in FIG. 2 includes several data stores, including an advertising campaign store 205, an ad query store 210, a user profile store 215, and an ad result store 220. The advertising system in this embodiment also includes several computing modules that may be implemented in software or hardware, including a simulation module 225, ad pacing module 230, and ad report module 235. In other embodiments, the advertising system 100 may include additional, fewer, or different components for various applications. For example, in one embodiment the advertising system 100 is incorporated into a social networking system or other system. Conventional components such as network interfaces, security functions, load balancers, failover servers, management and network operations consoles, and the like are not shown so as to not obscure the details of the system architecture.

One or more advertising campaigns are included in the advertising campaign store 205. The advertising campaign specifies various parameters in which to serve an advertiser's advertisement. The advertisement content is text, image, audio, video, or any other suitable data presented to a user. The advertising campaign may specify a budget, duration, bid amount, bid frequency, targeting criteria, among other parameters. The bid amount is associated with an advertisement by an advertiser and is used to determine an expected value, such as monetary compensation, provided by an advertiser to the advertising system 100 if the advertisement is presented to a user, if the advertisement receives a user interaction, or based on any other suitable condition. For example, the bid amount specifies a monetary amount that the social networking system 100 receives from the advertiser if the advertisement is displayed and the expected value is determined by multiplying the bid amount by a probability of the advertisement being accessed. When a budget and duration are specified, as the advertisements are provided to client devices 110, the advertiser spends a portion of the budget to serve the advertisement. The duration indicates a length of time for the advertising campaign to spend the budget. That is, it is expected that the budget will be spent during the advertising campaign's duration.

The bid amount indicates the bid amount of an advertiser for an advertising auction prior to accounting for the budget or duration of the advertisement. In one embodiment, the bid amount is paced and adjusted by the advertising system 100 to account for whether the spending for the advertising campaign is above or below desired spending amounts for the specified duration of the ad campaign. This pacing is further described with respect to FIG. 3. In addition to the bid amount, a bid frequency may also be modified for an advertisement. In this example, instead of, or in addition to, pacing the bid amount, the bid frequency is adjusted to change how often the adverting campaign bids on an eligible advertisement. For example, the bid frequency may initially indicate to bid on every eligible ad, but may be revised by the advertising system to reduce bid frequency if the budget is spent in excess of expectation.

Additionally, an advertisement request may include one or more targeting criteria specified by the advertiser. Targeting criteria included in an advertisement request specify one or more characteristics of users eligible to be presented with content in the advertisement request. For example, targeting criteria are a filter to apply to fields of a user profile and/or actions associated with a user to identify users having user profile information or actions satisfying at least one of the targeting criteria. Hence, the targeting criteria allow an advertiser to identify groups of users matching specific targeting criteria, simplifying subsequent distribution of advertisements to groups of users.

In one embodiment, the targeting criteria may specify actions or types of connections between a user and another user or object of a social networking system. In this embodiment, the advertising system 100 may communicate with a social networking system to provide advertisements and to receive user-related information to determine which users are eligible for the advertisements. The targeting criteria may also specify interactions between a user and objects performed internal or external to the social networking system, such as on a third party system. For example, the targeting criteria identifies users that have taken a particular action, such as sending a message to another user, using an application, joining a group, leaving a group, joining an event, generating an event description, purchasing or reviewing a product or service using an online marketplace, requesting information from a third-party system, or any other suitable action. Including actions in the targeting criteria allows advertisers to further refine users eligible to be presented with content from an advertisement request. As another example, targeting criteria may identify users having a connection to another user or object or having a particular type of connection to another user or object.

Each user of the advertising system 100 is associated with a user profile, which is stored in the user profile store 215. A user profile includes declarative information about the user that was explicitly shared by the user and may also include profile information inferred by the advertising system 100. The user profile store 215 may be stored externally to the advertising system, and may be accessed by an advertising system by querying a social networking system or other store of user data. In various embodiments such requests may be encrypted or hashed to preserve user privacy. In one embodiment, a user profile includes multiple data fields, each describing one or more attributes of the corresponding user. Examples of information stored in a user profile include biographic, demographic, and other types of descriptive information, such as work experience, educational history, gender, hobbies or preferences, location and the like. A user profile may also store other information provided by the user, for example, images or videos. A user profile in the user profile store 215 may also maintain references to actions by the corresponding user performed on content items, in a social networking system or with advertisements provided by the advertising system 100.

The ad query store 210 includes a record of advertising queries received by the advertising system 100. The ad query store 210 thus records ad queries previously received and served by the advertising system 100. The advertising system 100 simulates selection of advertisements to serve the queries that may differ from the advertisements that were previously selected for the advertisement query. Each ad query represents a request from a client device for an advertisement and is associated with a user of the client device. The ad query may indicate, for example, that a request was received from a specific user at a specific time and may represent one or more advertisement slots to be provided to the client device 110. For example, a given ad query may indicate that three advertisement slots are available for the user.

The ad query may also be associated with a reserve price for each of the advertisements. The reserve price reflects an amount that must be exceeded by an advertiser auction to place an advertisement in the slot. When no advertisement exceeds the reserve price, for example, the ad publisher may provide additional or alternative content in the advertising slot. This additional content may suggest, for example, additional engagement for the user with the ad publisher.

The ad result store 220 maintains a record of advertisements selected for a set of advertising queries. For example, the original selection of advertising results that were selected when ads were served by the advertising system 100 may be stored in the ad result store 220. In addition, when an advertisement simulation is performed by the simulation module 225, the results of the simulated advertisement may also be stored in the ad result store 220. The ad results indicate, for each of the ad queries, which advertisement was selected for the advertisement slots in an ad query and what price is paid by the advertiser for the ad placement. Each simulation of ad selection may store results in ad results store 220.

The simulation module 225 performs simulation of a set of ad queries to assign advertisers to ad queries. To perform the simulation, the simulation module 225 identifies ad results for a portion of the ad queries termed a segment. The ad results are generated by applying ad conditions for a set of advertisers to each ad query in the segment using an ad model. The ad conditions indicate specific attributes of the ad campaign, which may be modified during the simulation of the set of ad queries, and between each segment of ad queries. The ad conditions that are modified may include a bidding value for an advertisement, such as a paced bid amount, bidding frequency, and targeting criteria. The ad model is a formula or other algorithm for determining the advertiser and price for a given ad query using the ad conditions. The ad model is typically an auction that determines a winning bid amount and advertiser from among competing advertisers.

The simulation module 225 may also determine the competing advertisers for an ad query. In one embodiment, the competing advertisers are identified in the ad query store 210 as the advertisers that previously bid on the ad query when the ad query was originally provided an advertisement by advertising system 100. In another embodiment, the competing advertisers are determined by determining targeting criteria and/or bid frequency to the ad query. For targeting criteria, the simulation module 225 determines competing advertisers by comparing targeting criteria of the advertiser with user profile characteristics of the user associated with the ad criteria. Advertising campaigns that specify characteristics associated with the user in the user profile store 215 may compete to serve the advertisement. Similarly, the bid frequency may be analyzed to determine whether this ad query should not be bid on by the advertiser to maintain the bid frequency. For example, an advertiser with a bid frequency of 90% may not be eligible to compete for an ad query on every tenth ad query.

The ad model used for the advertising auction may also vary in embodiments, and can comprise any method for determining a winner at an auction. The ad model may also incorporate the reserve price for the ad query to prevent bids from winning that do not exceed the reserve price. The ad model may apply a "price-per-impression" model, a "price-per-click" model, or price-per-conversion. To determine the auction winner in price-per-click and price-per-conversion models, the ad model converts a bid price to an expected value that accounts for the likelihood that a user clicks or performs the conversion activity. The final price from the bidding process may also vary across ad models. For example, the final price paid by the winning advertiser in the bidding process may be a first-price auction or a second-price (Vickrey) auction. Certain ad queries may also present more than one ad slot for which an advertiser may be selected. These ad slots may also be treated as having a uniform price, or each advertising slot may be discounted relative to the most valuable slot. Thus, the advertising slots may have descending value based on the location on a page being viewed by the user.

The simulation module 225 provides the ad results for the segment to the ad pacing module 230, which modifies the ad conditions for the subsequent segment of advertising requests. The simulation module 225 may use the results of the simulation to determine the size of the next segment to simulate. Stated another way, the simulation module 225 determines the frequency of segmenting the set of ad queries and the total number of segments simulated by the simulation module 225. That is, the segmenting frequency indicates how frequently a new segment is generated. Between each segment, the ad pacing module 230 may revise the ad conditions. When many segments are used relative to the number of ad queries, the ad simulation is more likely to correctly mirror the actual conditions of serving ads, as the pacing module 230 may adjust ad conditions more frequently. However, when relatively fewer segments are used, the simulation may be performed more quickly. To determine the number of ad queries for a segment, the simulation module 225 determines the change of conditions that occurred after the segment and increases or decreases the number of ad queries for the next segment accordingly. That is, when the ad conditions have a relatively low rate of change, the number of ad queries in a segment may be increased, as serving the ads has not significantly changed the conditions under which those ads are selected. When the ad conditions have a relatively high rate of change, the number of ad queries in a segment is decreased, as serving the ads is changing those conditions.

To perform this comparison, the simulation module 225 stores the ad conditions for previously simulated segments and compares the ad conditions for previous segments to the conditions calculated for the next segment by the ad pacing module 230 to determine a change in ad conditions. The simulation module 225 may maintain a threshold for individual types of conditions (e.g., pacing, targeting criteria, or bid frequency), or the change in each condition may be combined and compared to a threshold. When the ad condition change is above a threshold, the number of ad queries in the segment is decreased, and when that change is below a threshold, the number of ad queries is increased. The ad conditions may be evaluated with respect to all advertising campaigns applied in the simulation, or may be evaluated with respect to a target advertising campaign. As an example, the paced bid amount for a target advertiser may be modified by the ad pacing module 230 after a segment is evaluated by simulation module 225, and the modified ad pacing is in excess of the specified threshold. In response, the simulation module 225 reduces the number of ad queries included in the next segment to be evaluated. The simulation is further described with respect to FIGS. 4-6. By using adjusting the size of the segments simulated by the simulation module 225, the advertising system 100 simulates auctions quickly with a segment size optimized for the actual change in ad conditions for the advertisements.

The ad pacing module 230 modifies ad conditions based on the ad results of a segment of advertisements. The ad conditions modified by the ad pacing module 230 may include a paced bid amount, targeting criteria, and bid frequency for an ad campaign. The modification of ad conditions is further described with respect to FIG. 3.

The ad report module 235 analyzes the ad results from a simulated advertisement. The ad report module 235 may generate reports describing the simulated results, such as the reach and number of advertisements provided by an advertiser in the simulation and cost to the advertiser of the advertisement placement selected in the simulation. The ad report module 235 may also generate reports describing the advertising system 100 more generally, such as the total amount of revenue generated by the selected advertisements in a simulation or the frequency with which the reserve price was selected, and so forth.

The ad report module 235 may also perform A/B testing for additional features of the ad model. For example, the ad report module 235 may determine the different in revenue to the advertising system based on different ad models used by the simulation module 225 as designated by an operator of the advertising system 100. For example, the ad model in one simulation may specify a highest-price auction with reserve prices, while a second simulation specifies a second-price auction that excludes reserve prices.

Figure 3:
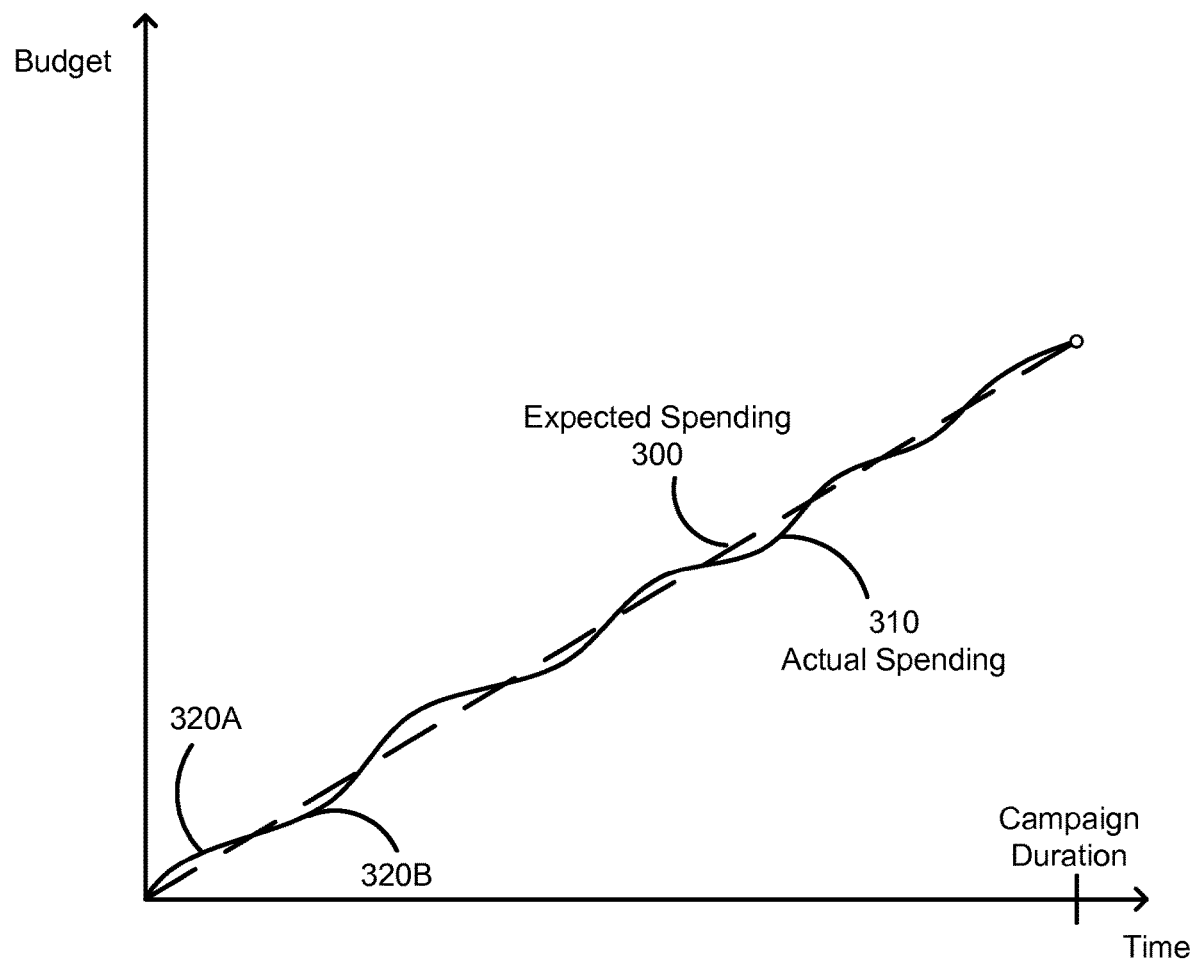
FIG. 3 shows an example advertising campaign budget and spending over the duration of the advertising campaign.

FIG. 3 shows an example advertising campaign budget and spending over the duration of the advertising campaign. The ad pacing module 230 may consider an advertising campaign budget and spending to determine ad conditions after an ad segment is simulated by the simulation module 225. The ad pacing module 230 compares the expected spending 300 of a campaign to the actual spending 310 of the campaign during the segment. The expected spending 300 indicates the desired spending of the campaign at a given point in the campaign to reach the campaign budget at the end of the campaign duration. In one embodiment, the expected spending 300 at each point in the campaign is the budget of the campaign divided by the portion of the campaign that has been simulated. For example, a campaign that is evaluated at 3 days into a 6-day campaign is 50% of the campaign, and the expected spending would be 50% of the total budget. Various and more complex functions may also be used to determine the expected spending 300 of a campaign. The actual spending 310 of a campaign may vary above or below the expected spending.

The actual spending 310 of a campaign is based on the ad queries for which the campaign is selected as the winning bid and the price for the ad placement. The actual spending 310 may be updated after each segment is simulated by the simulation module 225. As ads are selected, the actual spending 310 may be above 320A or below 320B the expected spending 300. When the actual spending 310 is above 320A the expected spending 300, the ad pacing module 230 may adjust ad conditions for the campaign to reduce spending by the campaign, and likewise when the actual spending 310 is below 320B the expected spending 300, the ad pacing module 230 may adjust ad conditions for the campaign to increase spending by the campaign.

To adjust the ad conditions, the ad pacing module determines the difference between the actual spending 310 and the expected spending 300 as a pacing value for the campaign. The pacing value is applied to one or more of the ad conditions for an advertiser to adjust the number of ads are likely to be selected for the advertiser. For example, a paced bid value may be selected based on the pacing value. The current paced bid for the campaign is identified and may be multiplied by or adjusted with the pacing value to determine a new paced bid. The ad conditions adjusted by the pacing value may also include targeting criteria and the bid frequency. The targeting criteria may be adjusted to increase or decrease the number of conditions that may be satisfied to be eligible for an advertisement. The advertising campaign may specify that certain users are expected to be more or less valuable than other users. To adjust the targeting criteria and decrease the targeted users, one or more of the less-valuable targeted groups may be removed from the targeting criteria applied as the ad conditions. To increase the targeted users, one or more of the removed groups may be added to the ad conditions. By adjusting these ad conditions for an advertiser, that advertiser's actual spending 310 can be corrected for the next segment of the simulation to more closely align with the expected spending.

When the pacing module 230 receives the results of a simulated ad segment from the simulation module 225, the pacing module 230 determines the actual spending and expected spending for each advertiser and adjusts the ad conditions for each of the advertisers. In one embodiment, the ad conditions are modified only one of the advertisers, for example to provide ad simulation results more quickly.

Figure 4:
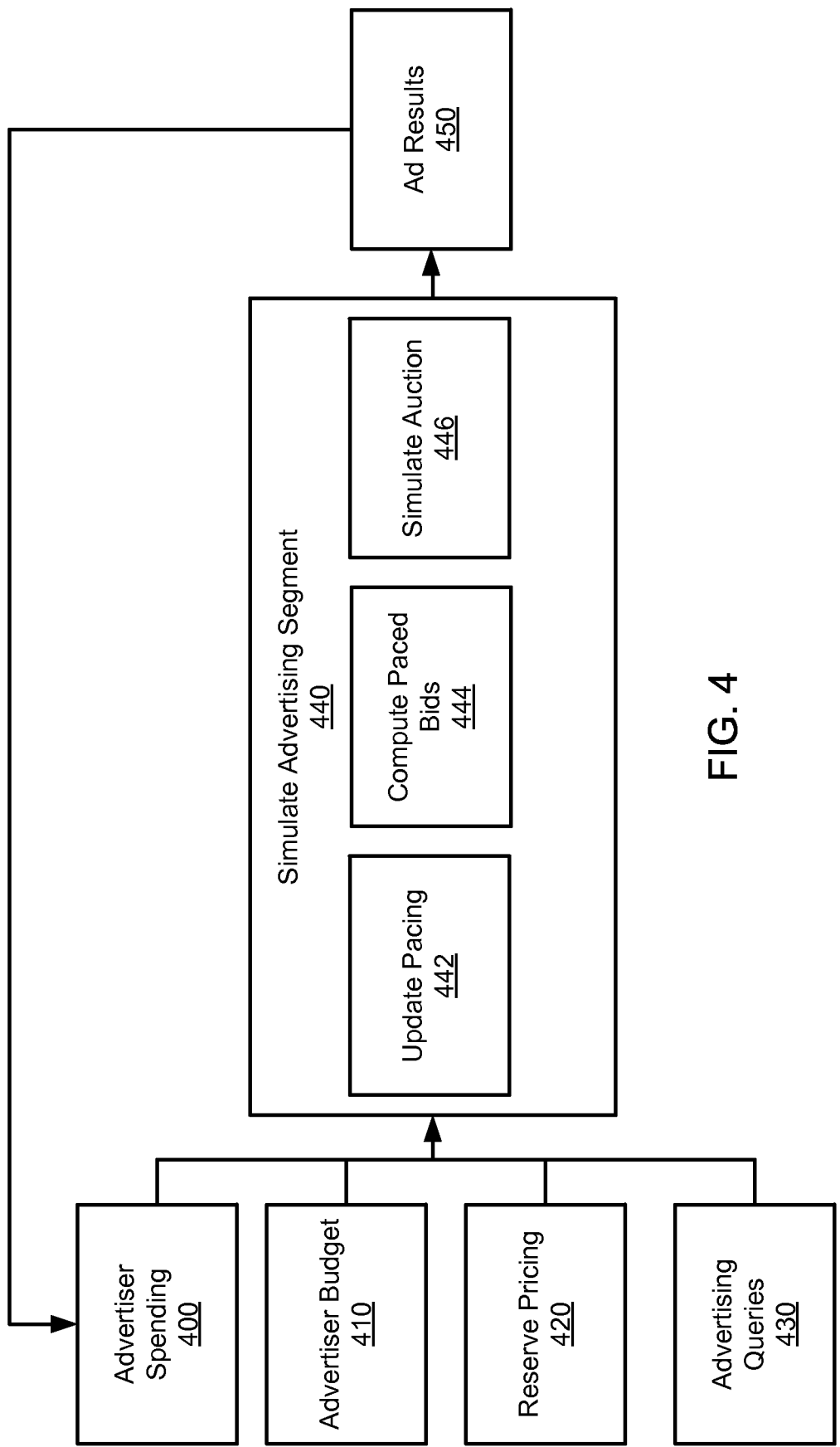
FIG. 4 conceptually illustrates a simulation of segments of an ad query according to one embodiment.

FIG. 4 conceptually illustrates a simulation of segments of an ad query according to one embodiment. To simulate a segment, the simulation module 225 identifies the advertiser spending 400, advertiser budget 410, reserve pricing 420, and ad queries 430. As noted above, the reserve pricing 420 may be associated with individual ad queries 430. To simulate each advertising segment 440, the pacing value for each advertiser is updated 442, for example by the pacing module 230. Using the pacing value, the ad conditions, such as a paced bid, are updated by the pacing module 230. The updated ad conditions and pacing value are evaluated by the simulation module 225 to determine the number of ad queries to simulate for this segment. As noted above, the change in ad conditions indicates whether too many or too few ad queries are being simulated in a segment by determining whether the ad conditions are changing above or below a threshold. Next, the ad queries in that segment are simulated in the auction 446 to generate the ad results 450. Using the ad results, the advertiser spending 400 is adjusted according to the ad placements that were won by each of the advertisers.

Figure 5:
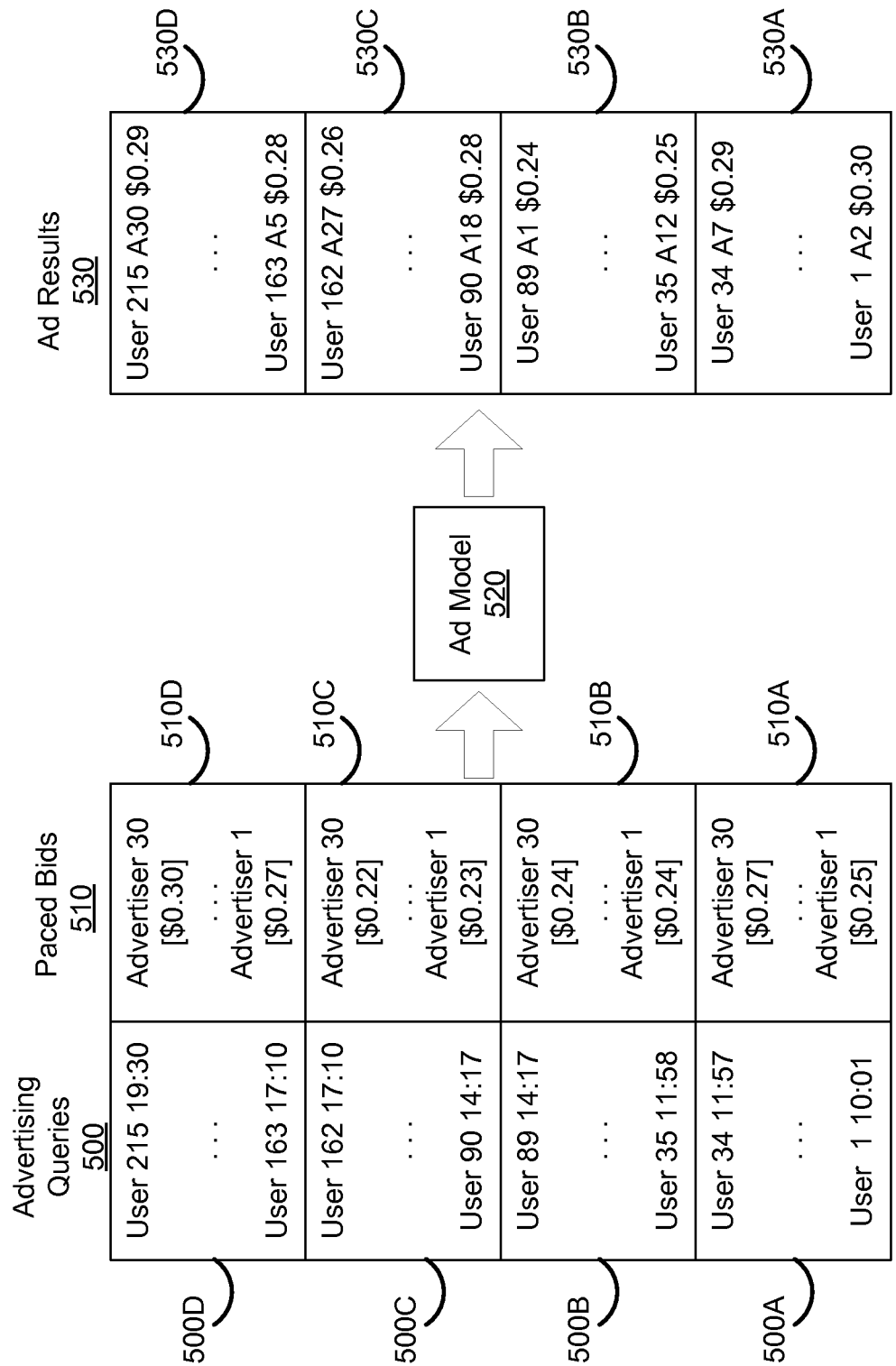
FIG. 5 shows example simulation of ad queries and related ad results.

FIG. 5 shows an example simulation of ad queries and related ad results. In this example, advertising queries 500 include ad requests 500A-D, which indicate ad queries received from many different users. For simplicity in this example, each user is chronologically numbered. In practice, each user may request ads many times in the set of ad queries simulated by the advertising system 100. Each ad query is associated with a user and a time that the query was received. As shown in this Figure, the advertising queries 500 are assigned ad results 530 in four segments, A-D. In this example, thirty advertisers 510, 1-30, provide bids to place advertisements with each of the ad queries 500.

Using the ad queries 500A and paced bids 510A, the ad model 520 determines ad results 530A specifying the advertiser and related price winning the auction for each ad query. As noted above, the ad model 520 may determine which advertisers will bid on the ad query 500 using the related targeting criteria for the advertiser and bidding frequency. Then, the paced bids 510 for the eligible advertisements compete in the bidding model 520 for the ad segment. The "A" segment is evaluated by the ad model 520 to assign advertisers to these advertisements as ad results 530A. In this example, the "A" segment includes users 1-34. As indicated in ad results 530, User 1 is assigned advertiser 2, designated A2, at a price of $0.30, and user 34 is assigned advertiser 7, designated A7, at a price of $0.29. Using the ad results, the ad conditions are updated for the next segment, segment "B." Included in the updated ad conditions are the paced bids 510B for the advertisers. As shown in this example, the paced bids in segment "B" for advertiser 1 and advertiser 30 have decreased relative to the bids in segment "A" to account for pacing of the advertising budget. The number of ad queries in segment "B" has also increased relative to the ad queries in segment "A," indicating that the change in ad conditions was lower than a threshold. Similarly, segment B is simulated to generated ad results 530B.

These ad results 530B adjust the paced bids 510C and so forth, until all of the segments have assigned ad results 530.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
identifying a set of previously received, time-ordered advertising queries, each advertising query in the set of previously received advertising queries identifying a user and defining a past opportunity to present at least one advertisement to the user;
determining, by a processor, simulation auction results for the set of advertising queries as a plurality of sequential segments of advertising queries in the set of advertising queries, by:
determining advertising results for a first segment of the plurality of sequential segments by assigning advertising queries to an advertiser from a set of advertisers and by applying advertising conditions to an advertising model for the first segment of advertising queries, the advertising results including an auction winner and winner price;
sequentially determining advertising results for each additional segment of the plurality of sequential segments by:
updating one or more advertising conditions for each advertiser from the set of advertisers based on the determined results of prior segments, the advertising conditions including a paced bid amount;
determining a change in advertising conditions for at least one advertiser in the set of advertisers by comparing the updated advertising conditions of the additional segment to the advertising conditions of a prior segment;
determining a segment size of advertising queries for the additional segment based on the change in advertising conditions compared to a threshold;
determining advertising results for the additional segment having the determined segment size by assigning each advertising query in the additional segment to an advertiser from the set of advertisers by applying the updated advertising conditions to the advertising model for the additional segment of advertising queries, wherein the advertising conditions are constant while determining the advertising results for the additional segment.

2. The method of claim 1, wherein determining the segment size of advertising queries for the additional segment comprises determining the change in the paced bid amount for the at least one advertiser in the set of advertisers, and increasing the segment size of advertising queries for the additional segment when the change in paced bid amount is below a threshold value or decreasing the segment size of advertising queries for the additional segment when the change in paced bid amount is above a threshold value.

3. The method of claim 2, wherein determining the change in paced bid amount comprises determining the change in paced bid amount from a plurality of advertising results associated with a plurality of sequential segments of advertising queries.

4. The method of claim 1, wherein updating advertising conditions comprise updating the paced bid amount for at least one advertiser from the set of advertisers based on a budget for the advertiser.

5. The method of claim 1, further comprising:
determining alternate advertising results for another segment of the plurality of sequential segments by applying advertising conditions to an alternate advertising model for the first segment of the plurality of sequential segments.

6. The method of claim 1, wherein each of the advertising queries is associated with a reserve price, and further comprising:
identifying a modified reserve price associated with at least one advertising query; and
determining alternate advertising results for another segment of the plurality of sequential segments by applying the modified reserve price to the advertising model for the first segment of the plurality of sequential segments.

7. The method of claim 1, wherein the paced bid amounts for the advertisers are determined based on a pacing algorithm, and further comprising:
applying a modified pacing algorithm to determine modified paced bid amount for at least one advertiser;
determining alternate advertising results for another segment of the plurality of sequential segments by applying the modified paced bid amount to the advertising model for the first segment of the plurality of sequential segments.

8. A non-transitory computer-readable medium storing instructions for execution on a processor, the instructions when executed by the processor causing the processor to perform steps comprising:
identifying a set of previously received, time-ordered advertising queries, each advertising query in the set of previously received advertising queries identifying a user and defining a past opportunity to present at least one advertisement to the user;
determining, by a processor, simulation auction results for the set of advertising queries as a plurality of sequential segments of advertising queries in the set of advertising queries, by:
determining advertising results for a first segment of the plurality of sequential segments by assigning advertising queries to an advertiser from a set of advertisers and by applying advertising conditions to an advertising model for the first segment of advertising queries, the advertising results including an auction winner and winner price;
sequentially determining advertising results for each additional segment of the plurality of sequential segments by:
updating one or more advertising conditions for each advertiser from the set of advertisers based on the determined results of prior segments, the advertising conditions including a paced bid amount;
determining a change in advertising conditions for at least one advertiser in the set of advertisers by comparing the updated advertising conditions of the additional segment to the advertising conditions of a prior segment;
determining a segment size of advertising queries for the additional segment based on the change in advertising conditions compared to a threshold;
determining advertising results for the additional segment having the determined segment size by assigning each advertising query in the additional segment to an advertiser from the set of advertisers by applying the updated advertising conditions to the advertising model for the additional segment of advertising queries, wherein the advertising conditions are constant while determining the advertising results for the additional segment.

* * * * *